UNITED STATES PATENT OFFICE.

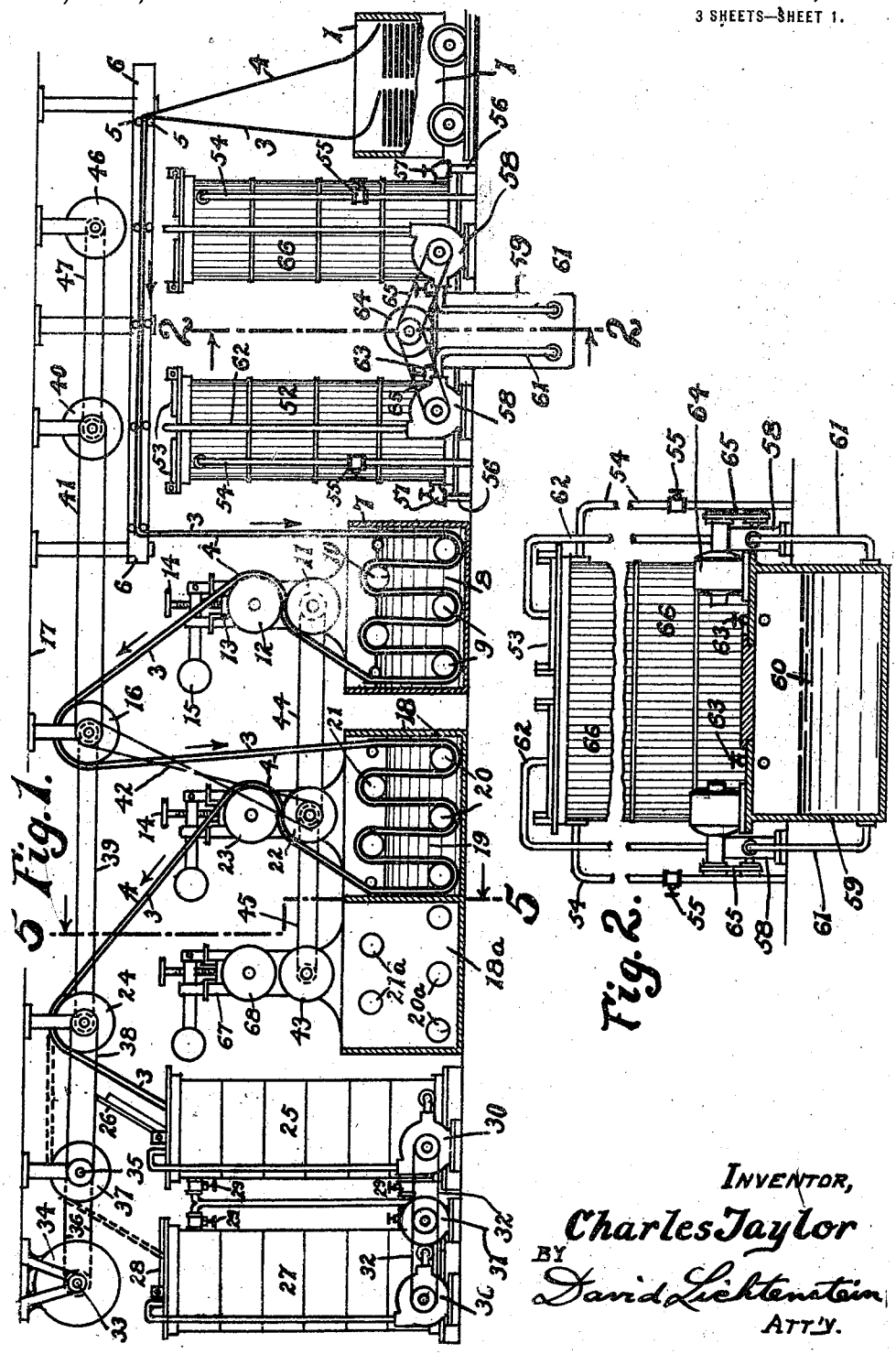

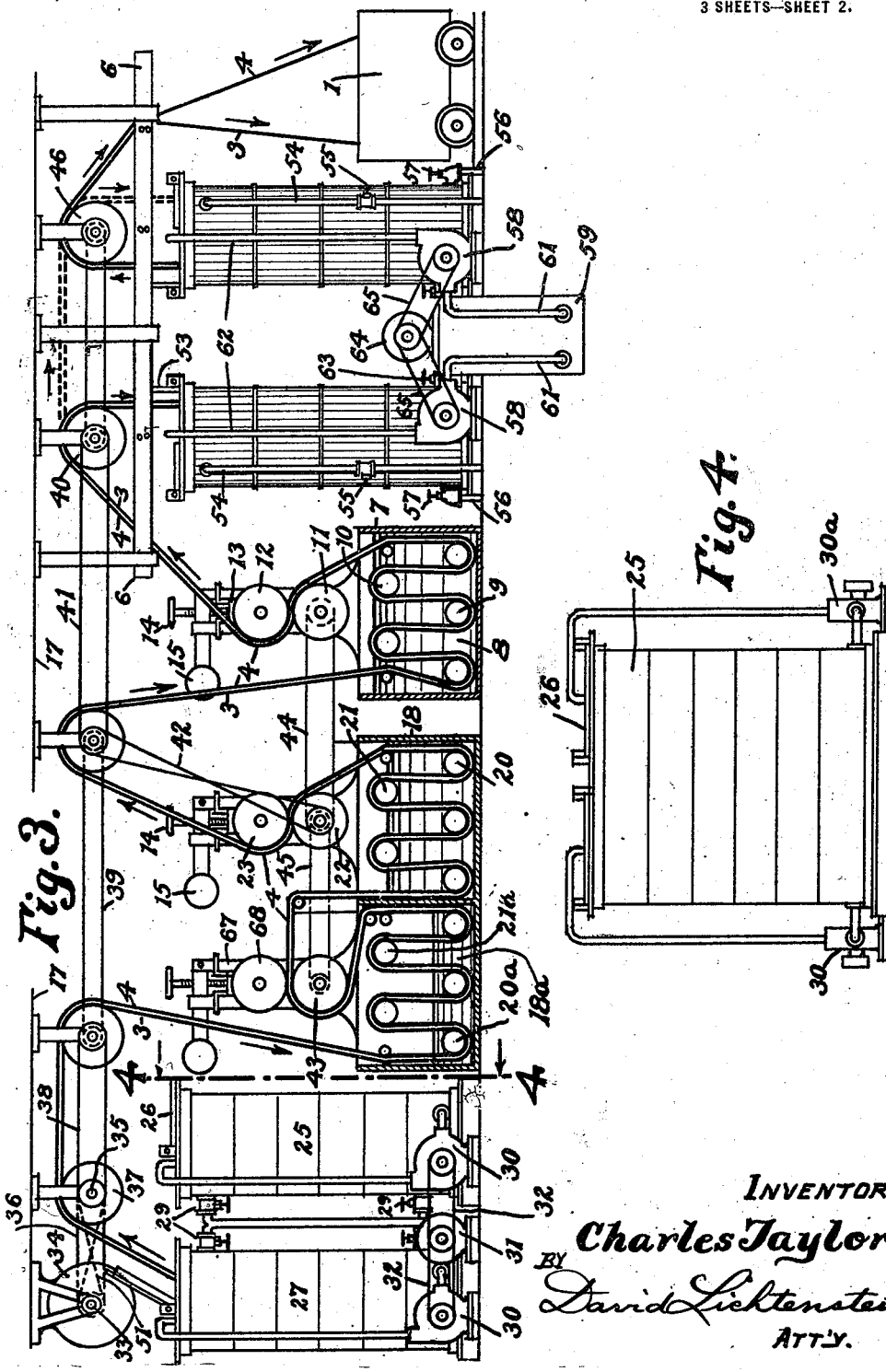

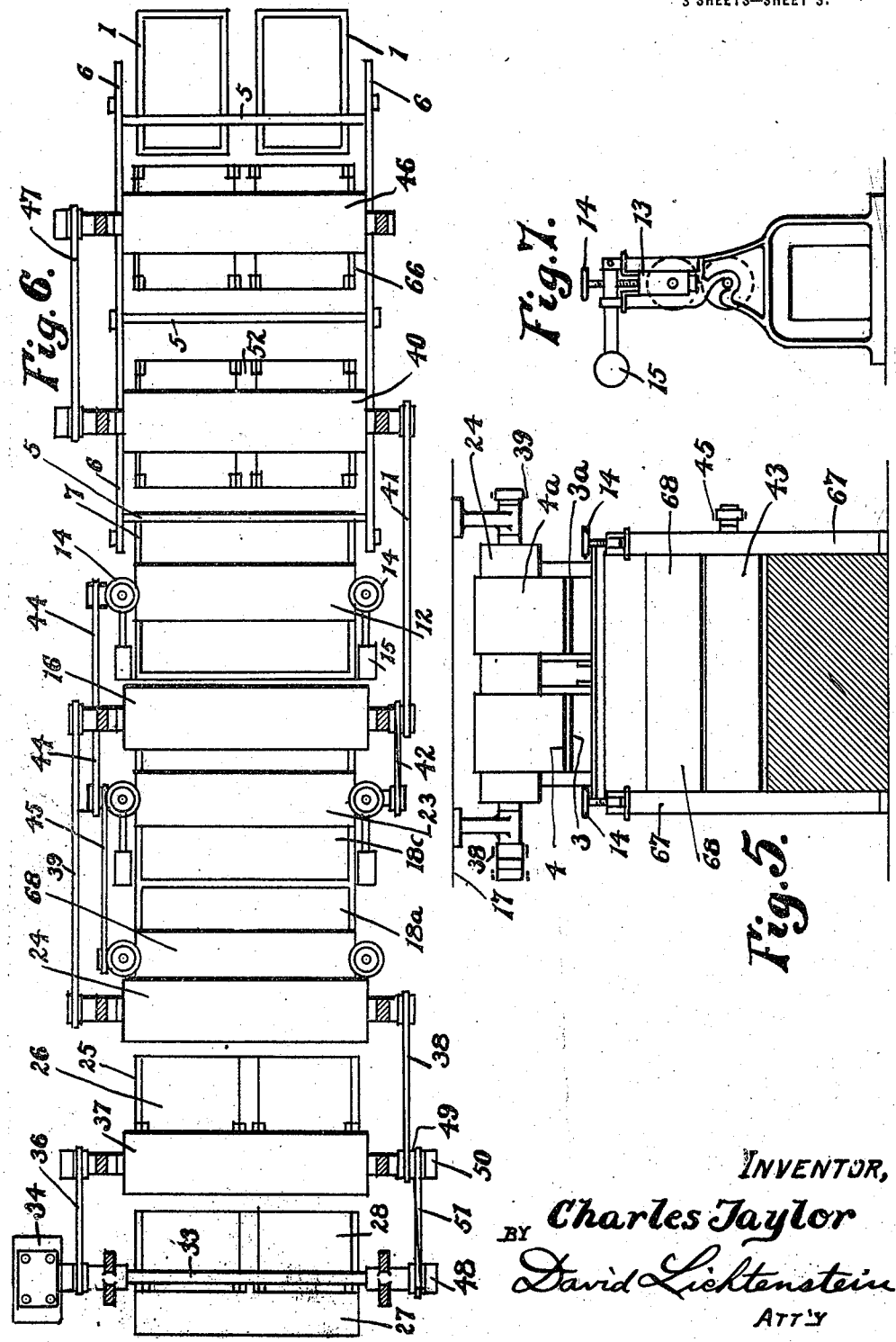

CHARLES TAYLOR, OF NORTH ADAMS, MASSACHUSETTS.

PLANT FOR BLEACHING FABRICS IN OPEN FORM.

1,201,388.　　　　Specification of Letters Patent.　　Patented Oct. 17, 1916.

Application filed January 21, 1916. Serial No. 73,463.

*To all whom it may concern:*

Be it known that I, CHARLES TAYLOR, a subject of the King of Great Britain, and resident of North Adams, in the county of Berkshire and State of Massachusetts, have invented a new and useful Plant for Bleaching Fabrics in Open Form, of which the following is a specification.

The object of my invention is to provide a plant for bleaching fabrics in open form, consisting of apparatus which is arranged in line and coupled to handle and convey the fabrics from the delivery-truck through the different baths and into the boiling keir, in one direction, and to return the fabrics from the boiling keir through the different baths and finally into the souring-tank in the opposite direction; thereby providing a plant for bleaching fabrics in the open form, which is simple in construction, compact and easy to operate, making it possible to handle large amounts of material with the least amount of labor in the shortest length of time. This plant is intended to be used in conjunction with my process for bleaching fabrics in open form, covered under Patent No. 1,146,461, issued July 13, 1915.

This invention consists in the improvements which I will now proceed to describe and claim, and is particularly intended to permit the continuous running of fabrics through the consecutive steps of the aforesaid bleaching process, and finally depositing the material, after having undergone the steps of the process, into souring-tanks provided for the purpose, where the same are allowed to set to whiten, after which they are washed and soured.

Of the accompanying three sheets of drawings, forming a part of this specification, Figure 1, represents a diagrammatic view of the plant showing the vats in section and the fabrics superimposed, one over the other, and passing through the plant, the same being conveyed from the delivery-truck through the vats containing the different chemical solutions, and into the boiling keir for boiling purposes. Fig. 2, represents a view taken on line 2—2 in Fig. 1, looking in the direction of the arrows, showing the souring-tank and the supply-tank containing the souring solution. Fig. 3, represents the same view as Fig. 1, but shows the fabrics being conveyed back through the plant from the boiling keirs, after the boiling treatment, through the several vats containing chemical solutions, after which they are finally deposited within the washing and souring-tank for washing and souring purposes. Fig. 4, represents a view taken on line 4—4 in Fig. 3, looking in the direction of the arrows, showing a double boiling keir which is preferably used in a plant where two sets of fabrics are to be treated at the same time, as shown in the following figure. Fig. 5, represents a sectional view taken on line 5—5 in Fig. 1, looking in the direction of the arrows, showing a double set of fabrics being conveyed through the plant, the same being deposited in a double boiling keir similar to that shown in Fig. 4. Fig. 6, represents a plan view of the plant, showing the same constructed of a width sufficient to accommodate a double set of fabrics, as shown in Fig. 5. Fig. 7, represents an end view of the squeezing-roller supporting frame, showing the common type of adjustable means used for varying the tension between the squeezing-rollers.

Like numerals refer to like parts throughout the several views of the drawings.

In the drawings, the numeral 1 represents a delivery-truck loaded with two ends 3 and 4 of fabric, which are being conveyed over the rollers 5 of the apron-member 6, into the vat 7 containing the bleaching liquor 8. The ends 3 and 4 are wound around the lower and upper vat-rollers 9 and 10, respectively, and after leaving the vat 7, are guided between the squeezing rollers 11 and 12, which are of the ordinary type and which are preferably provided with the adjusting journals 13, adjusting-studs 14, and weights 15, for permitting the required tension between the upper squeezing-roller 12 and the lower squeezing-roller 11.

The fabrics 3 and 4, after passing through the squeezing-rollers 11 and 12, are guided over the conveying-roller 16 which is preferably supported by suitable means from the ceiling 17. From the conveying-roller 16 the fabrics 3 and 4 are directed into the second bleaching vat 18 which contains the second bleaching liquor 19 and is equipped with the lower and upper rollers 20 and 21, respectively, about which are wrapped the fabrics 3 and 4 which become saturated with the liquor 19 and then pass between the lower squeezing-roller 22 and the upper squeezing-roller 23, being also provided with adjusting means for allowing the required tension on the material squeezed between them, the drippings of which material go back into the vat 18. Upon leaving the squeezing-rollers 22 and 23, the fabrics 3 and 4 are directed to the conveying-roller 24, which conveying-roller leads the fabrics 3 and 4 into the boiling keir 25, which keir is provided with the lid 26 which may be raised to the open position shown in Fig. 1, or lowered to the closed position indicated in Fig. 2. Aside of the keir 25 is an auxiliary keir 27 which is similar to the aforesaid keir 25, and is also provided with a lid 28 which is also adapted to be open or closed, as is the case with the lid 26 of the keir 25. The boiling keir 25 and 27 are preferably of the ordinary type provided with the live steam admission valves 29, which permit the steam to be admitted either at the top or at the bottom of the keirs, as desired. The keirs are also provided with the ordinary type of circulating pumps 30 which keep the liquor of the keirs circulating during the boiling process, the pumps sucking the liquor through the bottom of the keirs and delivering it back into the tops of the same. The pumps 30 are driven by any suitable means, preferably by means of the motor 31 which is rotatably coupled with the pumps through the belts 32 which are preferably arranged so that the motor 31 may drive both pumps at the same time, or either one of said pumps, by the shifting of the belts accordingly, the pump shaft being preferably provided with loose and fixed pulleys for accomplishing the same.

Where a double boiling keir of the type shown in Fig. 4, is used in the plant, a second circulating pump 30ª similar to 30 is used and belted with a small motor, in a similar manner to that shown in the case of the pumps 30.

33 represents the main driving-shaft which is preferably coupled with the driving-motor 34, which motor is preferably of the reversible type for the purpose of driving the mechanism of the plant in either direction, according as is desired, so that the fabrics may be fed and conveyed through the plant from the delivery-truck 1 to the boiling keirs in one direction, or returned back from the boiling keirs to the souring-tanks or truck (as may be required) in the other direction. The driving-shaft 33 is connected with the conveying-roller-shaft 35 by means of the belt 36 which rotates the conveying-roller 37. The conveying-roller 37 in turn drives the conveying-roller 24 by means of the belt 38. The conveying-roller 24 rotates the conveying-roller 16 by means of the belt 39. The conveying-roller 16 rotates the conveying-roller 40 by means of the belt 41. The conveying-roller 16 is also rotatably connected with the squeezing-roller 22 of the vat 18 by means of the belt 42, which squeezing-roller 22 is rotatably connected, to drive the squeezing-rollers 11 and 43, by means of the belts 44 and 45, respectively. The conveying-roller 40 drives the conveying-roller 46 by means of the belt 47.

It may thus be observed that the conveying mechanism of the plant, (i. e. the conveying-rollers, squeezing-rollers of the vats etc.) are rotatably connected to operate together for feeding the material through the plant in the same direction, which is either feeding the material from the delivery-truck to the boiling keirs, or returning the material from the boiling keirs into the souring-tanks or delivery-truck,—it being understood that by means of the reversible type of motor 34, used for supplying the motive power for driving the rotatable mechanism of the plant, that the same may be rotated in either direction therewith for conveying the fabrics in either of the directions above referred to.

When the driving-shaft 33 is being driven by steam or other such motive power, instead of being directly coupled with the reversible type of motor 34, as shown in Figs. 1, 3 and 6, the main driving-shaft 33, as shown in Fig. 6, may be extended and provided with a wide pulley 48 which may be connected with the combination fixed and loose pulleys 49 and 50, by means of the shifting and crossed reversing belt 51, which belt may be used for driving the rotatable mechanism of the plant in the reversed direction to that being driven by the belt 36, said belts being used in the alternative for driving the rotating mechanism of the plant in either direction,—it being understood that both the belts 36 and 51 must be associated with combination types of pulleys for allowing either one or the other to be shifted to run idle so that the other may drive the plant in the desired direction, the belt 36 being employed when feeding the material from the delivery-truck to the boiling keirs, and the other belt 51 being used for driving the plant in the reversed direction. The lattice-rollers 5 as well as the vat-rollers 9, 10, 20, 21, 20ª and 21ª may also be rotatably connected by any suitable means with the aforesaid rotatable mechanism of said plant for rotating in both directions therewith if desired.

52 represents a souring-tank which is preferably provided with the lids 53 on the top of the same through which the material may be deposited within the same.

54 is a water-supply-pipe which enters the top of the tank and is preferably adapted to supply and spray the water into the tank on the top of the material deposited therein, said spray being regulated by means of the regulating-valve 55 provided for the purpose.

56 is a drain for said tank which is supplied with the valve 57 which permits the water, supplied by the pipe 54, to drain out from the bottom of the tank. The water thus circulating through the material deposited in the tank, washes the same and frees it of the chemicals and other superfluous matters freed therefrom by means of the action of the treatments supplied thereto.

58 is a circulating pump similar to the pumps 30 shown associated with the boiling keirs. The pumps 58 are connected with the supply-tank 59 which is supplied with the souring liquid 60, which liquid is pumped through the pipes 61 into the pumps 58 and are then forced into the tops of the souring-tanks through the pipes 62. Thus the souring liquid is allowed to circulate through the souring-tanks and is discharged back into the tank 59 through the discharge valve 63 provided for the purpose. The circulating pumps 58 are suitably connected with the driving motors 64 by means of the belts 65, similar to the arrangement shown in the case of the circulating pumps 30 associated with the boiling keirs.

66 is the auxiliary tank which is similar to the tank 52. The souring-tanks 52 and 66 are preferably of the double type shown in Fig. 2, where a double type of plant is used, as shown in Figs. 5 and 6.

The vat 18 is preferably of the double type and is provided with the second chamber 18$^a$ which is used for the return trip of the fabrics from the boiling keirs, after the boiling has taken place, the chamber 18$^a$ being also provided with the lower and upper rollers 20$^a$ and 21$^a$, respectively. Said chamber is also provided with the squeezing-roller attachment 67 which is similar to the other squeezing-rollers used, and has the upper roller 68.

In Fig. 5, 3$^a$ and 4$^a$ represent a second set of fabrics which are superimposed one over the other, similar to the fabrics 3 and 4, and are being conveyed along with the same through the plant and deposited into the double boiling keirs,—it being noted here that the plant permits the handling of a double set of fabrics, as shown in Fig. 5, or may permit the handling of a single set, and that where it is required to handle a plurality of sets, the same may be accomplished to equal advantage by providing the plant with similar apparatus of sufficient widths to accommodate such plurality of layers.

It may be further noted, that any number of boiling keirs may be used to suit conditions,—it being understood, where a plurality of keirs are used, that while one is loaded and undergoing the boiling process, the others may be loaded or unloaded, and while one is being fed and loaded, the other may be undergoing the boiling process. For saving time and for permitting the handling of a larger amount of material in the same manner, a plurality of souring-tanks may be supplied in the plant, which will permit one to operate while the other is being loaded with material, or permit one to be unloaded while the other is being loaded with material, or operating upon the material deposited therein.

Having thus described the apparatus of the plant in detail, it may be observed that the same affords a very compact and efficient plant for handling fabrics in the open form and treating the same as called for under my aforesaid patent. The apparatus is easily manipulated and absolutely reliable, requiring the least number of help to attend to the same and at the same time permitting the greatest amount of material to be handled within a given time, the plant being specially intended to be used in conjunction with my patented process for bleaching fabrics in the open form heretofore referred to.

It may further be understood that the plant acts as a unit and is composed of the least number of machines possible for bleaching and washing purposes.

Referring to Fig. 3, which shows the fabrics as being returned through the plant after the same have been treated and boiled, it will be noted that the fabrics are thus traveling in the opposite direction to that shown in Fig. 1. It will be observed in this case, namely, in the return trip of the fabrics, that the fabrics pass through the third vat 18$^a$ which is shown idle in Fig. 1, and that the apron-member is substituted by the conveying rollers which direct the fabrics into the souring-tanks. Said Fig. 3 also shows the souring-tank 66 as being unloaded of the fabrics which have been deposited and treated therein, after the same have already passed through the plant.

It must be understood that the principle embodied in my invention may still hold good either by the adding on of any of the apparatus to the plant, shown used therein, or by reducing the number of any such apparatus shown used in the plant.

While the preferred embodiments of my invention have been described in detail, it will be understood that I do not wish to be limited to the particular construction set forth, since various changes in the form, material, proportions, and arrangements of parts and in the details of construction may be resorted to without departing from the spirit and scope of the invention, or destroying any of the advantages contained in the same, heretofore described and defined in the subjoined claims.

What I claim is—

1. A plant for bleaching fabrics in open form, consisting of the combination of an apron-member, a series of vats provided with squeezing-rollers, a series of overhead conveying-rollers, and a boiling keir provided with a circulating pump, said apparatus being arranged in line with the rotatable fabric conveying parts of the same coupled with each other to rotate together for conveying a continuous run of fabrics through the apparatus of said plant for the purposes set forth; and means for driving the rotatable parts of said apparatus.

2. A plant for bleaching and washing fabrics in open form, consisting of the combination of an apron-member, a series of vats provided with squeezing-rollers, a series of overhead conveying-rollers, a boiling keir provided with a circulating pump, and a souring-tank provided with circulating and washing means, said apparatus being arranged in line with the rotatable fabric conveying parts thereof coupled with each other and adapted to operate as a unit, rotating in one direction or the other, alternatively at will, for conveying a continuous run of fabrics in either direction through the apparatus of the plant for the purposes set forth; and means for driving the rotatable fabric conveying parts of said apparatus in either direction, substantially as shown.

3. A plant for bleaching and washing fabrics in open form, consisting of the combination of a series of vats provided with squeezing-rollers, a series of overhead conveying-rollers, a boiling keir provided with a circulating pump, and a souring-tank provided with circulating and washing means, said apparatus being arranged in line with said squeezing and conveying-rollers coupled with each other and adapted to operate as a unit, rotating in one direction or the other, alternatively at will, for conveying a continuous run of fabrics in either direction through the apparatus of the plant for the purposes set forth; and means for driving said squeezing and conveying-rollers of said apparatus in either direction, substantially as shown.

4. A plant for bleaching fabrics in open form, consisting of the combination of an apron member, a series of vats provided with squeezing-rollers, a series of overhead conveying-rollers, and a boiling keir provided with a circulating pump,—the aforesaid apparatus being arranged in line and having the squeezing and conveying-rollers thereof connected with each other to turn in the same direction for conveying a continuous run of fabrics through the apparatus of said plant for the purposes set forth; and means for driving said squeezing and conveying-rollers.

5. A plant for bleaching fabrics in open form, consisting of the combination of an apron member provided with friction rollers; a series of vats provided with conveying-rollers; a series of squeezing-rollers; a series of overhead conveying-rollers; a boiling keir provided with a circulating pump; means for rotatably and reversibly driving said squeezing and overhead conveying-rollers; means for operating said circulating pump of said boiling keir; and means for operating said reversible driving means.

6. A plant for bleaching and washing fabrics in open form, consisting of the combination of an apron member; a series of vats provided with rollers; a series of squeezing-rollers; a series of overhead conveying-rollers; a boiling keir provided with a circulating pump; a souring-tank provided with circulating and washing means; means for reversibly driving said squeezing and overhead conveying-rollers; means for operating the circulating pumps of said keir and souring-tank; and means for operating said reversible driving means of said squeezing and conveying-rollers.

7. A plant for bleaching and washing fabrics in open form, consisting of the combination of a series of vats provided with squeezing-rollers, a series of overhead conveying-rollers, a boiling keir provided with a circulating pump, and a souring-tank provided with circulating and washing means, said apparatus being arranged in line with said squeezing and conveying-rollers, coupled with each other and adapted to operate as a unit, rotating in one direction or the other, alternatively at will, for conveying a continuous run of fabrics in either direction through the apparatus of the plant for the purposes set forth; means for driving said squeezing and conveying-rollers of said apparatus in either direction; and means for operating said circulating means of said boiling keir and said souring-tank.

CHARLES TAYLOR.